Sept. 20, 1966 J. H. GUIGNARD 3,274,576

TELEMETERING ENCODER SYSTEM

Filed June 4, 1962 5 Sheets-Sheet 1

Jean Hubert Guignard
INVENTOR.

BY Richard E. Bee

ATTORNEY

Jean Hubert Guignard
INVENTOR.

BY Richard E. Bee

ATTORNEY

Jean Hubert Guignard
INVENTOR.

BY Richard E. Bee

ATTORNEY

Sept. 20, 1966 J. H. GUIGNARD 3,274,576

TELEMETERING ENCODER SYSTEM

Filed June 4, 1962 5 Sheets-Sheet 4

Jean Hubert Guignard
INVENTOR.

BY Richard E. Bee

ATTORNEY

Jean Hubert Guignard
INVENTOR.

BY Richard E. Bee

ATTORNEY 3,274,576

TELEMETERING ENCODER SYSTEM

Jean Hubert Guignard, L'Hay les Roses, France, assignor to Societe de Prospection Electrique Schlumberger, S.A., Paris, France, a corporation of France Filed June 4, 1962, Ser. No. 199,729
Claims priority, application France, July 12, 1961, 868,564
15 Claims. (Cl. 340—183)

This invention relates to telemetering encoder systems and particularly to telemetering encoder systems for time multiplexing data signals from a plurality of data transducers.

In time-multiplex telemetering systems heretofore proposed, the data signals from a plurality of data transducers or data signal sources are combined to form a single composite wave train by connecting the data sources one at a time in sequence to a common output signal circuit. Consequently, the composite wave train, which constitutes the multiplexed signal, is composed of a series of discrete intervals wherein the signal portion in each interval corresponds to a sample of the data signal provided by one of the data sources. This composite or multiplexed signal is then transmitted to a remote receiving station by means of a suitable transmission facility such as a physical transmission line or a radio communications link. In this manner, data signals from a relatively large number of data sources may be sent to a remote location by means of a single common transmission link.

Various problems have been encountered in these previously proposed telemetering systems. The individual data transducers are connected to the common output circuit by means of switching circuits or switching devices. The switching action, however, tends to introduce undesired signal transients into the composite output signal. These transients may be caused by incomplete synchronization of the switching operations in the various switching circuits or may be caused by momentary delays in the individual switching circuits changing from one condition to another or a combination of both factors. Another problem is that many of the switching circuits heretofore utilized tend to introduce undesired pedestal components into the composite output signal. Such pedestal components are generally in the form of steady D.C. background signals which are present in the switching circuits and which are superimposed on the desired data signals or, more accurately, the data signals are superimposed on the pedestals. Even though the different switching circuits are of similar construction, these pedestal components generally vary from one switching circuit to the next. This makes the problem of pedestal compensation considerably more difficult than might otherwise be the case.

The problem of undesired pedestal components is particularly troublesome in the case of diode-type switching circuits. Such diode-type circuits are desirable in view of their small size and relative simplicity. Such diode-type circuits, however, tend to introduce undesired pedestal components because of the small voltage drops across the diodes even though they are in a conductive condition. As is known, these internal voltage drops or voltage thresholds vary from diode to diode even where the diodes are nominally of identical construction.

Another problem that is encountered in multiplex telemetering systems occurs for the case of low level data-transducers, that is, data transducers which produce relatively weak output signals. In order to properly transmit these relatively weak data signals to a remote location, it is necessary to amplify such signals before they are transmitted. Consequently, it has been heretofore proposed to provide for each of the transducers which is of the low level type a signal amplifier for amplifying the transducer signal before it is applied to its respective switching circuit. This requires the use of several amplifier circuits. It also introduces a further problem since the gain factors of the different amplifiers will tend to drift or change by differing amounts during the operation of the telemetering system. It is very difficult to compensate for these relative errors.

It is an object of the invention, therefore, to provide a new and improved telemetering encoder system for time multiplexing a plurality of different data signals.

It is another object of the invention to provide a new and improved telemetering encoder system for providing time multiplexed signals having a minimum of switching transients.

It is a further object of the invention to provide a new and improved telemetering encoder system for providing time multiplexed signals having a minimum of pedestal components.

It is an additional object of the invention to provide a new and improved telemetering encoder system for time multiplexing low level signals and providing a higher level multiplexed signal with minimum relative errors in the various components thereof.

In accordance with the invention, a telemetering encoder system comprises a plurality of transducer means. The system also includes a common output signal channel. The system further includes switching circuit means for coupling the transducer means to the common output signal channel one at a time in sequence. The system also includes circuit means coupled to the common output signal channel for periodically forcing the signal in the output channel to assume a predetermined value.

For a better understanding of the present invention, together with other and further objects thereof, reference is had to the following description taken in connection with the accompanying drawings, the scope of the invention being pointed out in the appended claims.

Referring to the drawings.

Figure 1:
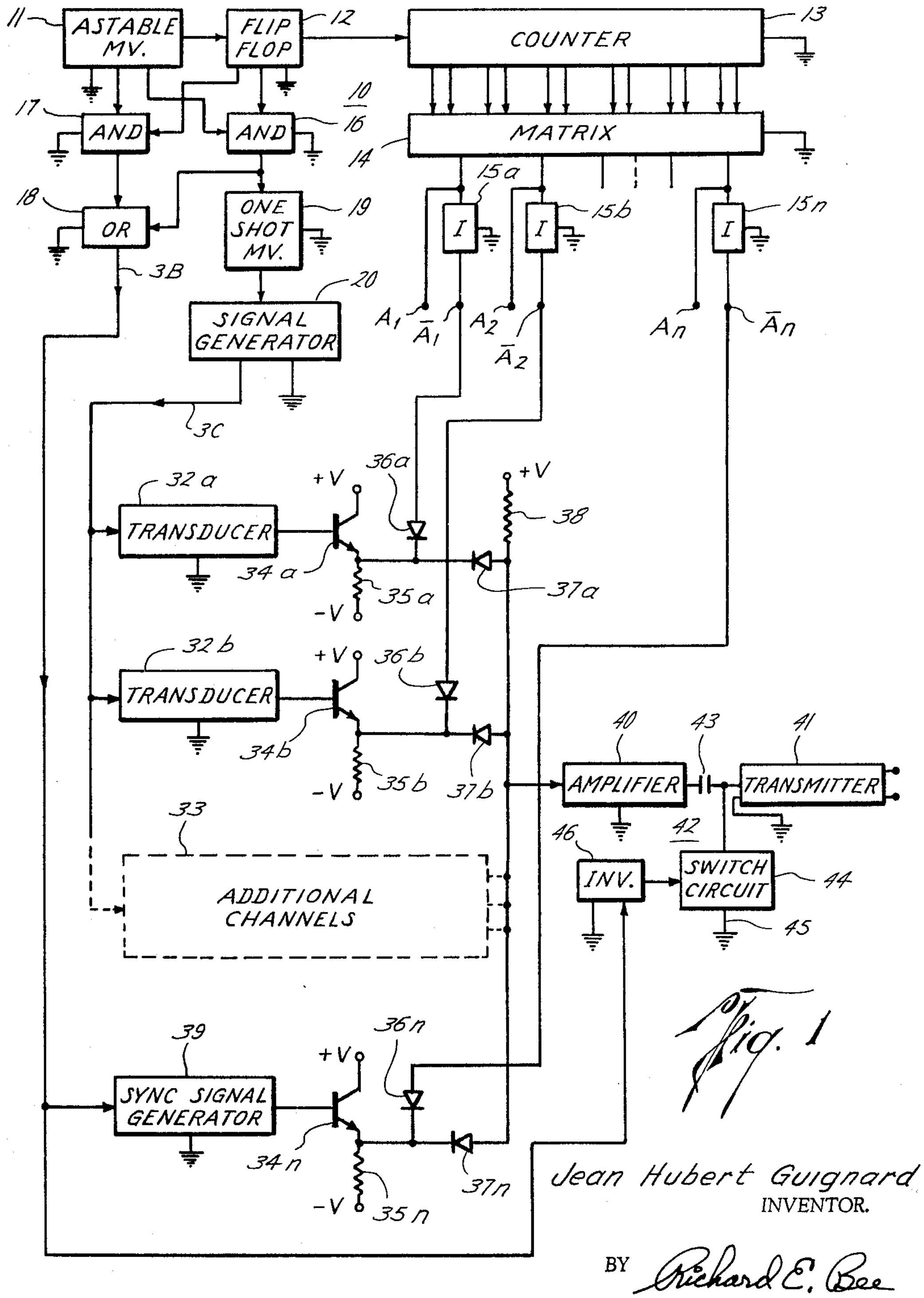
FIG. 1 is a circuit diagram of a representative embodiment of a telemetering encoder system constructed in accordance with the present invention.

Referring now to FIG. 1 of the drawings, there is shown a representative embodiment of a telemetering encoder system constructed in accordance with the present invention. This encoder system includes timing circuit means 10 for generating and supplying various timing, exciting and gating signals to the remainder of the system. This timing circuit means 10 includes a free-running or astable multivibrator 11 which drives a flip-flop circuit 12 which, in turn, drives a binary counter 13. The number of stages in counter 13 and, hence, its counting capacity is determined by the number of signals which the encoder system is intended to multiplex. Outputs from both sides of each counter stage are used to drive a matrix 14. Consequently, various gating signals $A_1$, $A_2$ . . . $A_n$ appear on the various output lines of the matrix 14. Complements or inverted replicas of these gating signals appear at the outputs of inverter circuits 14*a*, 15*b* . . . 15*n*. A first AND circuit 16 is coupled to each of the astable multivibrator 11 and the flip-flop 12 for developing an output pulse whenever the two possible binary conditions in each of the multivibrator 11 and flip-flop 12 bear a first relationship to one another. A second AND circuit 17 is also coupled to the multivibrator 11 and the flip-flop 12 for developing an output pulse whenever the binary conditions of these two circuits bear a second relationship to one another. The output pulses from AND circuits 16 and 17 are combined in an OR circuit 18 to produce a composite output pulse at the output thereof. The pulse developed at the output of AND circuit 16 is also used to trigger a one-shot multivibrator 19. The one-shot multivibrator 19 is used to drive a signal generator 20.

Figure 2:
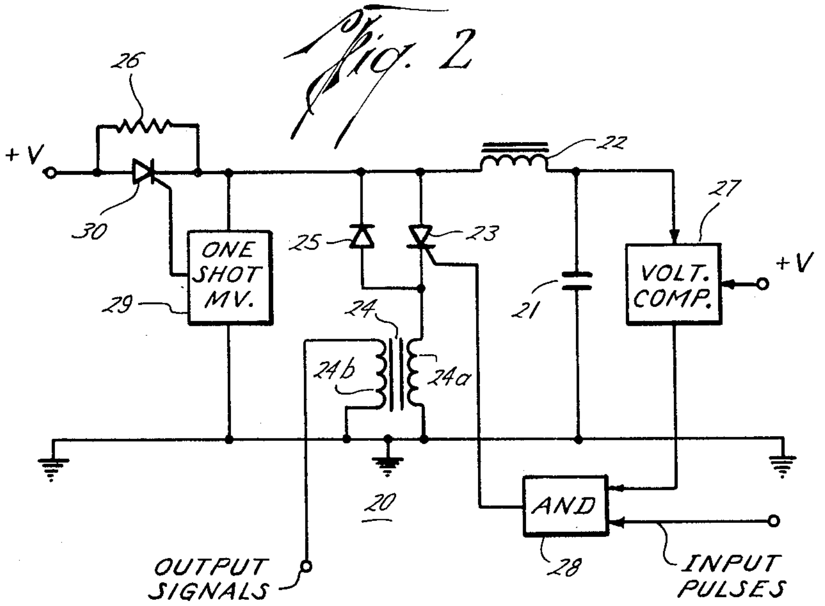
FIG. 2 is a detailed circuit diagram of a portion of the FIG. 1 system.

The details of the signal generator 20 are shown in FIG. 2 of the drawings. As there shown, the signal generator 20 includes a condenser 21 and an inductor 22 connected in series therewith. A series discharge circuit for the condenser 21 is completed by way of a semiconductor switching device 23 and a transformer 24. The semiconductor switching device 23 is a semiconductor device which behaves like a gas-filled thyratron tube. One commercially available form of such device is known as a "silicon controlled rectifier." Primary winding 24*a* of transformer 24 is of the low impedance type. A semiconductor diode 25 is connected across the semiconductor device 23 in an opposite polarity manner.

Condenser 21 is initially charged from a direct current voltage source +V by way of a high impedance resistor 26 and the inductor 22. The voltage level across condenser 21 is monitored by a voltage comparator 27. A reference voltage +V is also supplied to the voltage comparator 27 for reference purposes. When the voltage level across condenser 21 reaches a predetermined relationship with respect to the reference voltage +V, voltage comparator 27 operates to supply an activating signal to an AND circuit 28. This enables AND circuit 28 to pass any input pulses supplied to the second input terminal thereof.

Assuming that such an input pulse is supplied to the AND circuit 28 when it is in an activated condition, then this input pulse is passed by such AND circuit 28 to a control electrode of the semiconductor device 23. This renders the semiconductor device 23 conductive. This causes the condenser 21 to discharge by way of the inductor 22, the semiconductor device 23 and the low impedance primary winding 24*a*. Consequently, the energy stored on condenser 21 is transferred to the inductor 22. An energy transfer in the reverse direction is then permitted by the semiconductor diode 25. This returns the energy back to the condenser 21. During this energy return, the semiconductor device 23 has ceased to be conductive. Consequently, no further energy transfers are permitted. Thus, the series circuit formed by capacitor 21, inductor 22, the combination of device 23 and diode 25 and the primary winding 24*a* undergoes one complete cycle of oscillation each time a trigger pulse is supplied to the control electrode of the device 23. This oscillation produces a single-cycle sinusoidal signal in the secondary winding 24*b* of the transformer 24. This single-cycle sinusoid constitutes the output signal for the signal generator 20.

At the end of a cycle of oscillation, when both the device 23 and the diode 25 have ceased to be conductive, the voltage level at the upper end of these two devices suddenly rises to the voltage level across the condenser 21. This voltage level is somewhat less than the original voltage level across the condenser 21 due to the energy consumed by the load connected to the secondary winding 24*b* of transformer 24 and by any inherent resistances of the other devices in the series discharge circuit. This sudden voltage rise at the upper ends of device 23 and diode 25 is, however, sufficient to trigger a one-shot multivibrator 29. Multivibrator 29, in turn, triggers a second silicon controlled rectifier type semiconductor switching device 30. This renders the semiconductor device 30 conductive and, hence, enables a rapid recharging of the condenser 21 to its desired initial value. This rapid recharge takes place by way of the device 30 and the inductor 22. After a time sufficient to accomplish this purpose, the device 30 again becomes non-conductive. The signal generator 20 is then ready to undergo the next cycle of operation, which occurs when the next input pulse is supplied to the AND circuit 28.

It is seen from the foregoing that the signal generator 20 generates a single cycle of a sine wave signal at its output terminal each time a trigger pulse is supplied to its input terminal. The duration of each cycle of this single-cycle sine wave is approximately equal to the period of the series resonant frequency of the condenser 21 and the inductor 22. This signal generator 20 is described in greater detail in applicant's copending application Serial No. 191,025, entitled "Signal Generator," filed April 30, 1962.

Returning now to FIG. 1 of the drawings, the remainder of the telemetering encoder system there shown includes a plurality of transducer means for developing signals representative of physical quantities being measured. These transducer means are represented by transducers 32*a*, 32*b*, etc., additional transducers being included in the dash line box 33 bearing the legend "Additional Channels." Each of these transducers 32*a*, 32*b*, etc. is connected to the common source of exciting signals represented by signal generator 20.

The encoder system of FIG. 1 further includes switching circuit means for coupling the various transducers 32*a*, 32*b*, etc. to a common output channel one at a time in sequence. The switching circuit means for the transducer 32*a* includes a transistor 34*a* which is connected to a resistor 35*a* and to operating voltage sources +V and −V so as to form an emitter follower type circuit. This switching circuit also includes a control diode 36*a* and a coupling diode 37*a* having similar electrodes thereof connected to the emitter resistor 35*a*. The other electrode of the control diode 36*a* is connected to the inverter circuit 15*a*. The other electrode of the coupling diode 37*a* is connected to a common resistor 38 which, in turn, is connected to the supply voltage source +V.

The switching circuit means for the second transducer 32*b* includes a transistor 34*b*, emitter resistor 35*b*, control diode 36*b* and coupling diode 37*b*. The transistor 34*b* is connected to form an emitter follower circuit and the other end of coupling diode 37*b* is connected to the common output resistor 38. The other end of control diode 36*b*, however, is connected to the inverter circuit 15*b*. There is included within the dash line box 33 an additional switching circuit means for each of the additional transducers included therein. These additional switching circuit means are similar to those for transducers 32*a* and 32*b* with their respective control diodes being connected to appropriate additional inverter circuits associated with the output lines of matrix 14.

For synchronization purposes, the encoder system of FIG. 1 also includes a sync signal generator 39. This sync signal generator 39 is controlled by the timing signal appearing at the output of the OR circuit 18. The signal at the output of generator 39 should be of such a character as to be readily distinguishable from the signals produced by the transducers 32*a*, 32*b*, etc. As such, it may be in the form of a short burst of a sinusoidal signal having a frequency which is different from that associated with signal generator 20 or may, instead, be some form of pulse type signal. The sync signal generator 39 is also provided with a switching circuit means which is similar to those previously considered. Such switching circuit means includes a transistor 34*n*, an emitter resistor 35*n*, a control diode 36*n* and a coupling diode 37*n*. The coupling diode 37*n* is connected to the common output resistor 38, while the control diode 36*n* is connected to the inverter circuit 15*n* which is associated with the last output line from matrix 14.

The encoder system of FIG. 1 also includes a common output signal channel or signal transmission path. In the present embodiment, this common channel or path includes a signal amplifier 40 and a transmitter 41. The input side of the amplifier 40 is connected to the common output resistor 38 associated with the switching circuit means. Transmitter 41 includes the necessary circuits for transmitting the composite signal appearing at the output of amplifier 40 to a remote location. Transmitter 41 is constructed to have a relatively high input impedance. Where the transmission link is in the form of a physical transmission line, the transmitter 41 will usually include suitable power amplifier and impedance matching circuits for applying the signal to the transmission line. In the case of radio type communications links, the transmitter 41 will include suitable circuits for enabling the composite signal to modulate a radio-frequency carrier signal. Carrier signal techniques may also be used with physical transmission lines.

The encoder system of the present embodiment further includes circuit means coupled to the common output signal channel for periodically forcing the signal in the output channel to assume a predetermined value. In the present embodiment, this circuit means is represented by a clamping circuit means 42. Clamping circuit means 42 includes a condenser 43 connected in series in the signal path intermediate the amplifier 40 and the transmitter 41. The clamping circuit means 42 also includes a gated switch circuit 44 and a fixed reference potential means represented by a ground connection 45. Switch circuit 44 may be of either the diode or triode type. A simple triode switch is provided by utilizing a transistor and connecting its collector electrode to the condenser 43, its emitter electrode to the ground connection 45 and its base electrode to the source of gating signals. More refined forms of switch circuits, such as those used in known types of clamping circuits, may also be used. The main consideration is that a very low impedance be presented between the output side of condenser 43 and the reference potential means 45 when the switch circuit is conductive. In this regard, the output impedance of amplifier 40 is also made relatively low to provide a relatively short time constant circuit for the condenser 43 when the switch circuit 44 is conductive.

Gating signals for the switch circuit 44 are supplied from the OR circuit 18 by way of an inverter circuit 46. Some forms of switch circuits require both inverted and non-inverted gating signals. If such a switch circuit is used, then the output signal from OR circuit 18 is also supplied directly to such switch circuit along with the inverted signal from inverter 46. For simpler forms of switch circuits, a single polarity of gating signal is sufficient and, for simplicity of explanation, this is the case represented in the present embodiment. If it is desired to clamp the signal level at the input of transmitter 41 at some other value than ground potential, then a source of the appropriate D.C. reference potential is placed in series between the ground connection 45 and the lower side of switch circuit 44. This source of reference potential must have a relatively small value of internal impedance.

Figure 3:
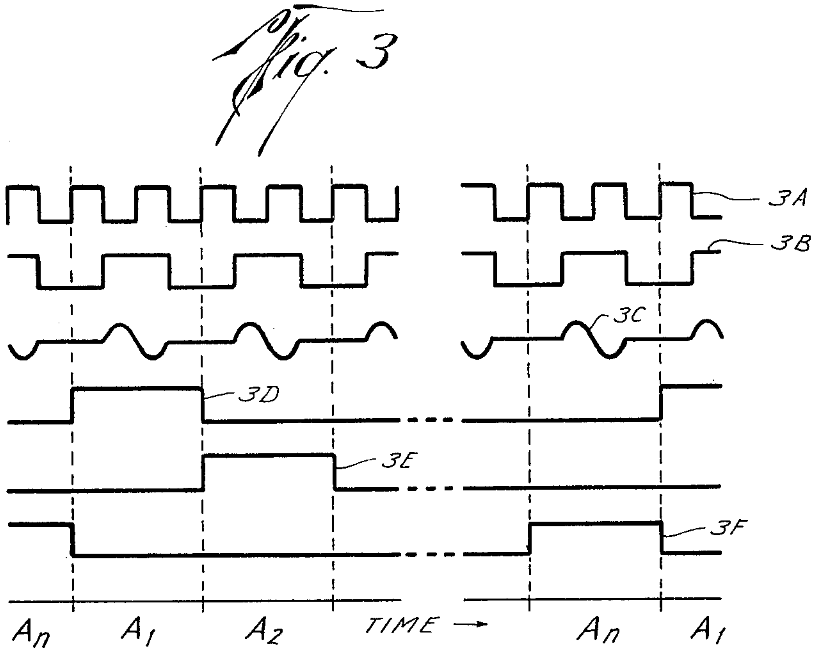
FIGS. 3 and 4 are timing diagrams used in explaining the operation of the FIG. 1 system.

Considering now the operation of the FIG. 1 encoder system, the astable multivibrator 11, being a form of oscillator circuit, continuously generates a primary timing signal. This primary timing signal is represented by waveform 3A of FIG. 3. The positive-going transitions in this timing signal are used to trigger the flip-flop circuit 12. Consequently, flip-flop 12 generates an output square wave signal of one-half the frequency of the primary timing signal. The positive-going transitions in this square wave signal at the output of flip-flop 12 are used to drive the counter 13. Matrix 14 is sensitive to the binary conditions of the various stages of counter 13 and, depending on how many counts have been mounted by the counter 13, supplies a gating signal to a particular one of the matrix output lines. After the first count has been counted, a gating signal appears on the $A_1$ output line, after the second count, a gating signal appears on the $A_2$ output line, etc., only one output line at a time having a gating signal thereon. Gating signals for output lines $A_1$, $A_2$ and $A_n$ are represented by waveforms 3D, 3E and 3F of FIG. 3. As will be seen, the duration of a gating signal determines the time interval during which one of the transducers is connected to the common output channel. Inverted replicas of these $A_1, A_2 \ldots A_n$ gating signals appear at the outputs of inverter circuits 15*a*, 15*b* . . . 15*n*.

As is seen from waveform 3A, the primary timing signal of astable multivibrator 11 serves to divide each of the gating intervals $A_1$, $A_2$, etc. into four parts or four quarters. AND circuits 16 and 17 are used to determine the occurrence of particular quarters in each of the gating intervals. The AND circuit 16 is used to develop an output signal only during the second quarter of each gating interval. This second quarter corresponds to a unique relationship in the binary conditions of the astable multivibrator 11 and the flip-flop 12. AND circuit 17 on the other hand is used to develop an output signal only during the third quarter of each gating interval. This is done by recognizing a second unique relationship in the binary conditions of the astable multivibrator 11 and the flip-flop 12. The output signals from AND circuit 16 and AND circuit 17 are combined by the OR circuit 18 to produce a composite output signal which prevails during the second and third quarters of each gating interval. The signals appearing at the output of OR circuit 18 are represented in waveform 3B of FIG. 3. As is seen, these signals serve to identify the occurrence of the middle portion of each of the gating intervals $A_1, A_2 \ldots A_n$.

The leading edge of the signal at the output of AND circuit 16 is used to trigger a one-shot multivibrator 19. Thus, multivibrator 19 is triggered at the beginning of the second quarter of each gating interval. Multivibrator 19, in turn, supplied a trigger pulse to the signal generator 20 each time multivibrator 19 is triggered. This trigger pulse is of shorter duration than the output pulse from AND circuit 16. As mentioned in connection with the detailed description for FIG. 2, each time a trigger pulse is supplied to the signal generator 20 this signal generator 20 generates an output signal corresponding to a single cycle of a sine wave. The output signals from signal generator 20 are represented by waveform 3C of FIG. 3. The circuit constants in the signal generator 20 are such that the duration of each single cycle sinusoid is equal to the duration of the second and third quarters of each gating interval. Thus, the duration of each single cycle sinusoid is the same as the duration of each of the midinterval timing signals appearing at the output of OR circuit 18 (waveform 3B).

The signals appearing at the output of signal generator 20 are used as exciting signals for the transducers 32*a*, 32*b*, etc. Thus, each time a single-cycle sinusoid appears at the output of signal generator 20, a corresponding single-cycle sinusoid appears at the output of each of the transducer 32*a*, 32*b*, etc. These single-cycle sinusoids at the outputs of the transducers 32*a*, 32*b*, etc. are, however, of different amplitudes depending on the physical conditions being sensed by the respective transducers. In other words, the physical quantity being measured by the transducer 32*a*, for example, serves to modulate or vary the amplitude of the single-cycle sinusoids appearing at the output of this transducer. Consequently, the single-cycle sinusoids appearing at the output of any given transducer constitute the data signals for that transducer.

The data signals from the different transducers 32*a*, 32*b*, etc. are coupled one at a time in sequence to the input of the signal amplifier 40. In particular, the data signal from transducer 32*a* is coupled to the amplifier 40 by way of the transistor 34*a* and the coupling diode 37*a* whenever these elements are in a conductive condition. Whether these elements are conductive or non-conductive is determined by the inverted gating signal $\overline{A_1}$ supplied to the control diode 36*a*. Whenever this gating signal $\overline{A_1}$ is at its higher level (during non-$A_1$ gating intervals), the control diode 36*a* is conductive and current flows therethrough and through the emitter resistor 35*a* to the negative potential source —V. This places the junction between the control diode 36*a* and the emitter resistor 35*a* at a relatively high positive voltage level (+V or greater). This high positive level renders the transistor 34*a* and the coupling diode 37*a* nonconductive. Consequently, no data signals may pass from the transducer 32*a* to the amplifier 40. If, on the other hand, the $\overline{A_1}$ gating signal supplied to the control diode 36*a* is at its lower level (only during the $A_1$ gating interval), the control diode 36*a* is rendered nonconductive. This enables current to flow from the positive source +V through the resistor 38, the coupling diode 37*a* and the emitter resistor 35*a* to the negative source —V. The values of resistors 38 and 35*a* are selected so that the average level at the emitter of transistor 34*a* is such as to render the transistor 34*a* conductive. Consequently, in this condition the data signal from transducer 32*a* will be passed by the transistor 34*a* and the coupling diode 37*a* to the input of the amplifier 40.

The switching circuits associated with the other transducers operate in a similar fashion so that during their respective gating intervals, their data signals are supplied to the amplifier 40. Thus, during the second gating interval $A_2$, the data signal from the transducer 32*b* is supplied to the amplifier 40 by way of its transistor 34*b* and its coupling diode 37*b*.

During the last gating interval, namely, the $A_n$ gating interval, the sync signal generator 39 is allowed to pass a sync signal to the input of amplifier 40. This sync signal is used at the remote receiving station for synchronizing the decoding operation whereby the different data signals are separated and applied to separate measuring devices.

Figure 4:
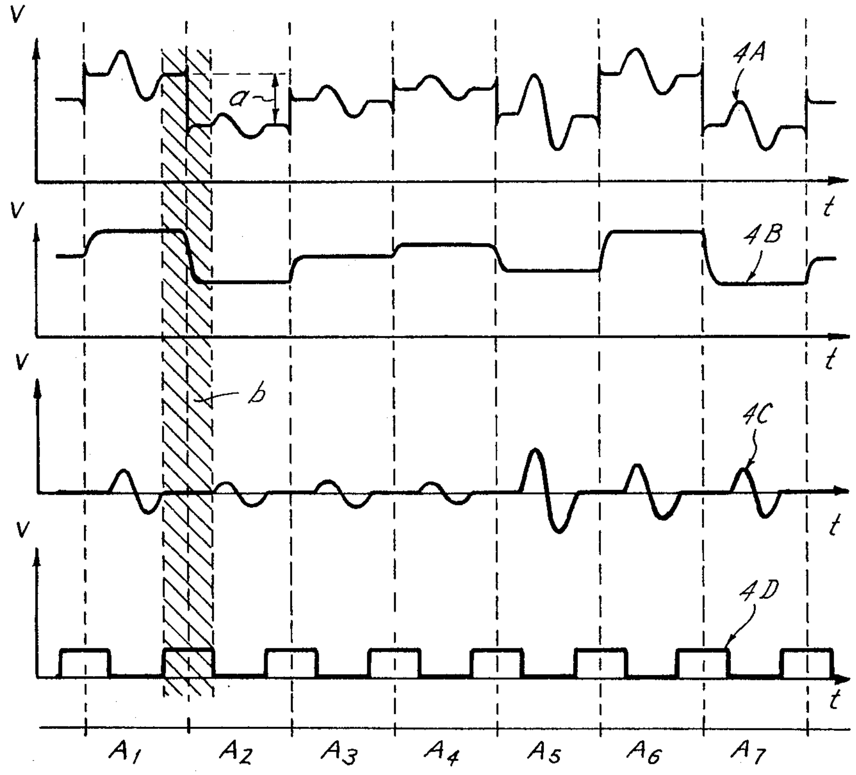

A typical representation for the composite signal appearing at the input of amplifier 40 is indicated by waveform 4A of FIG. 4. As there seen, the sinusoidal data signal for each of the transducers is superimposed on a D.C. voltage level. This D.C. voltage level constitutes an undesired pedestal component. In the present embodiment, these pedestals are produced primarily by the voltage drops occurring across the coupling diodes 37*a*, 37*b*, etc. Unfortunately, these voltage drops and, consequently, the resulting signal pedestals are of different values for the different diodes. The difference in the pedestal levels during gating intervals $A_1$ and $A_2$ is represented by dimension *a* of waveform 4A. Another undesirable feature of the composite signal is the sharp spikes or impulses which are generated when switching from one transducer to the next. These impulses are undesired switching transients and occur at the boundary lines between the gating intervals $A_1$, $A_2$, etc.

In the present embodiment, both the undesired pedestal components and the undesired switching transients are removed or eliminated by the clamping circuit means 42 located intermediate the amplifier 40 and the transmitter 41. The operation of this clamping circuit means 42 is controlled by the timing signal appearing at the output of OR circuit 18. In particular, this timing signal is supplied to the inverter circuit 46. Inverter circuit 46 produces an inverted replica of this timing signal. This inverted timing signal is represented by waveform 4D of FIG. 4. As there seen, it defines the portions of each gating interval immediately adjacent the boundary line between gating intervals. It is during these intervals that the switch circuit 44 is rendered conductive. A typical one of these conductive intervals for the switch circuit 44 is indicated by cross-hatched region *b* of FIG. 4. This corresponds to an idle interval during which no exciting signals are being supplied to the data transducers.

With the switch circuit 44 conductive, the output side of condenser 43 is effectively short circuited to the reference potential means represented, in this case, by the ground connection 45. This accomplishes two purposes. It places the input of the transmitter 41 at a constant reference level. It also enables the condenser 43 to adjust its charge in accordance with the pedestal component for the next gating interval.

The charge, or more properly, the voltage drop across condenser 43 is represented by waveform 4B of FIG. 4. During the gating interval $A_1$, for example, the voltage drop across condenser 43 corresponds to the pedestal level of the composite signal during this gating interval. Consequently, the voltage drop across condenser 43 serves to balance out or cancel this pedestal component. When the sinusoidal data signal component for this $A_1$ gating interval has ceased, the switch circuit 44 is rendered conductive (shaded area *b*). Consequently, the voltage drop across condenser 43 is allowed to adjust itself to the pedestal voltage occurring during the $A_2$ gating interval. The time constant for the condenser 43 circuit during this conductive interval of switch circuit 44 is relatively short (compared to the conductive interval of switch circuit 44) to enable the condenser 43 to adjust itself fairly rapidly. The switch circuit 44 then returns to a non-conductive condition just as the sinusoidal data signal component for the gating interval $A_2$ appears. Since the input impedance of transmitter 41 is relatively high, the condenser 43 holds its charge or voltage drop during the occurrence of this sinusoidal component. Consequently, this condenser 43 voltage drop is effective during the occurrence of the sinusoidal component of the $A_2$ gating interval to balance out the $A_2$ pedestal component. Thus, only the sinusoidal component itself is passed to the transmitter 41. In a similar manner, the switch circuit 44 is activated intermediate the sinusoidal components for the other gating intervals to provide the desired pedestal compensation for these intervals.

The resulting signal at the input of transmitter 41 is represented by waveform 4C of FIG. 4. Whenever switch circuit 44 is conductive, waveform 4C is clamped at the reference potential level, in this case, a zero or ground level. As is seen from waveform 4C, both the pedestal components and the switching transients have been eliminated from the signal before it is supplied to the transmitter 41.

Since a common signal amplifier 40 has been used to amplify the signals from all of the transducers 32*a*, 32*b*, etc., no relative gain errors are introduced with respect to the different transducer signals. The use of a common amplifier for all transducers also makes it possible to apply an identical nonlinear characteristic to each of the transducer signals. For example, the amplifier 40 could be of the logarithmic type to provide for a logarithmic representation of the transducer signals.

Figure 5:
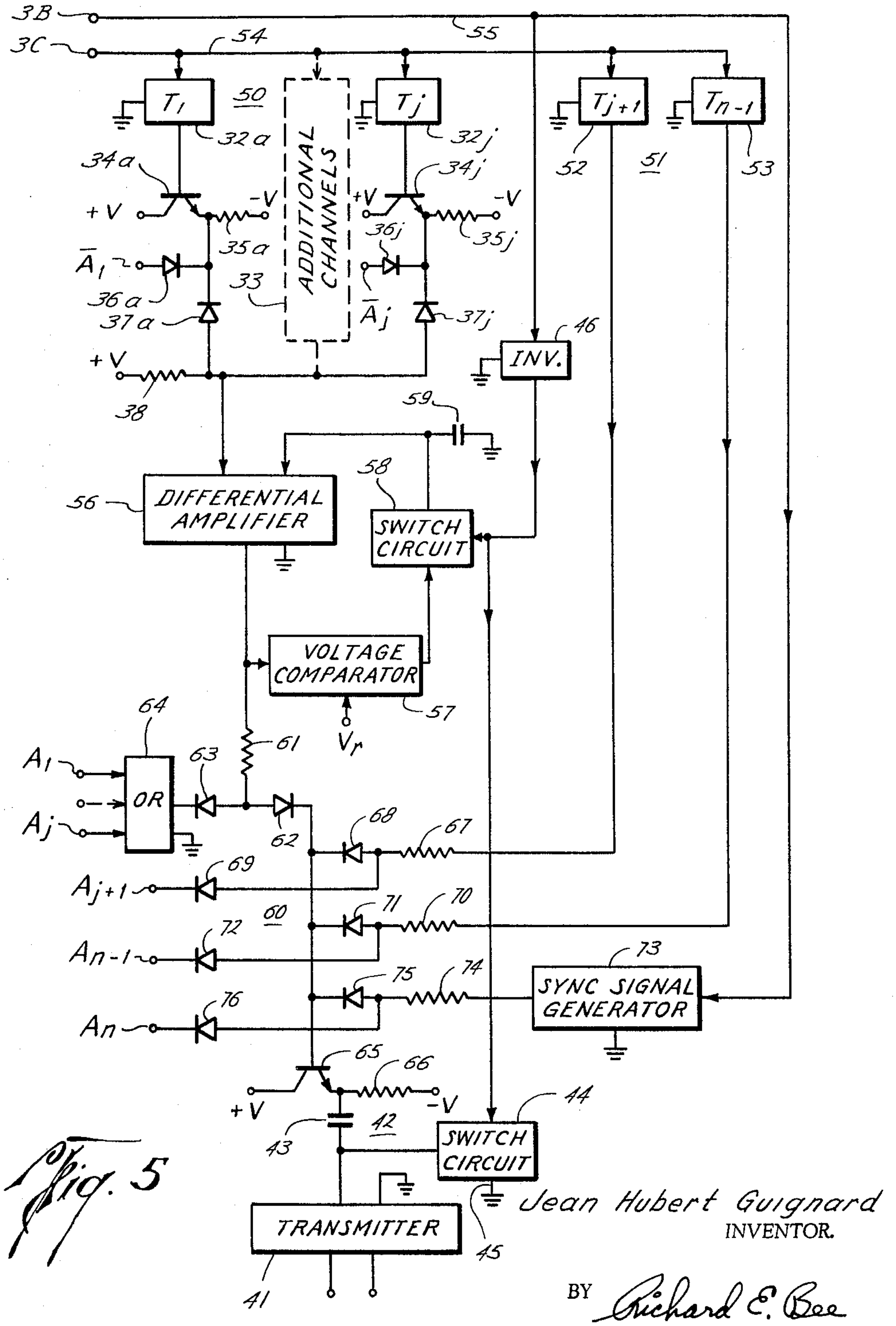
FIG. 5 is a circuit diagram showing a second embodiment of a portion of the FIG. 1 system.

Referring now to FIG. 5 of the drawings, there is shown a modified embodiment for a portion of the encoder system of FIG. 1. More particularly, FIG. 5 shows the transducers and circuits subsequent thereto for the case of an encoder system having a first group 50 of low level transducers and a second group 51 of high level transducers. The low level transducers are represented by transducers 32*a* . . . 32*j*. These transducers develop relatively weak output signals. The high level transducers are represented by transducers 52 and 53. These transducers produce relatively strong or large amplitude output signals. The sinusoidal exciting signals generated by signal generator 20 of FIG. 1 are applied to each of the transducers 32*a* . . . 32*j*, 52 and 53 by way of conductor 54. The mid-interval timing signal generated by OR circuit 18 of FIG. 1 is applied to the FIG. 5 apparatus by way of conductor 55.

The switching circuit means for the low level transducers 32*a* . . . 32*j* of FIG. 5 are the same as those for the transducers of FIG. 1 and, hence, the various elements thereof are indicated by corresponding reference numerals. These switching circuit means serve to connect the low level transducers 32*a* . . . 32*j* to a first input terminal of a signal amplifier 56 one at a time in sequence.

Signal amplifier 56 is of the differential type having a pair of input terminals and a common output terminal, the output signal corresponding to the difference between the two input signals. Differential amplifier 56 is provided with a relatively high gain factor, for example, a gain factor of 1000. A feedback circuit is provided between the output terminal and the second input terminal of the differential amplifier 56. This feedback circuit includes a voltage comparator 57, a switch circuit 58 and a signal storage means represented by a condenser 59. The condenser 59 is connected to the second input terminal of the differential amplifier 56. The amplifier 56 is constructed so that the input impedance of this second input terminal is relatively high. A source of D.C. reference potential $V_r$ is connected to a second input of voltage comparator 57. Switch circuit 58 is of the gated type and has a gate signal input terminal coupled to the output of inverter 46. Switch circuit 58 may be of the same construction as previously-considered switch circuit 44. The output impedance of the voltage comparator 57 and the series impedance of switch circuit 58 when conductive are made relatively small to provide a short time constant driving circuit or charging circuit for condenser 59.

In order to combine the composite low level transducer signal appearing at the output of differential amplifier 56 with the signals from the high level trransducers 62 and 53 in the proper time multiplexed manner, the system of FIG. 5 includes a second switching circuit means 60. This second switching circuit means 60 includes a first diode switching circuit for the output of differential amplifier 56, this first switching circuit including a resistor 61, a coupling diode 62 and a control diode 63. The control diode 63 is connected to an OR circuit 64. The input terminals of OR circuit 64 are connected to the matrix output lines $A_1 \ldots A_j$ (matrix 14 of FIG. 1) which provide the gating signals for the low level transducers 32*a* . . . 32*j*. The output side of the coupling diode 62 is connected to an emitter follower circuit which includes a transistor 65 and an emitter resistor 66. The diode switching circuit for the high level transducer 52 includes a resistor 67, a coupling diode 68 and a control diode 69. The control diode 69 is connected to the appropriate matrix output line. The output side of coupling diode 68 is connected to the input of the emitter-follower transistor 65. The diode switching circuit for the high level transducer 53 includes a resistor 70, a coupling diode 71 and a control diode 72, the latter being connected to the appropriate matrix output line. The output side of coupling diode 71 is also connected to the input of the emitter-follower transistor 65.

In the FIG. 5 embodiment, a sync signal generator 73 is operated in parallel with the high level circuits. Consequently, a diode switching circuit is also provided for connecting this sync signal generator 73 to the input of the emitter-follower transistor 65. This switching circuit includes a resistor 74, a coupling diode 75 and a control diode 76. Control diode 76 is connected to the last matrix output line ($A_n$) of the matrix circuit 14 (FIG. 1). The sync signal generator 73 generates a sinusoidal synchronizing signal having a frequency of twice the frequency of the exciting signal generated by signal generator 20 and having a duration corresponding to two complete cycles of such synchronizing signal. The sync signal generator 73 is controlled by the mid-interval timing signal supplied by OR circuit 18 by way of conductor 55. Other types of sync signal generators may be used if desired.

The output side of emitter-follower transistor 65 is coupled to the input of transmitter 41. A clamping circuit means 42 of the type previously considered is connected intermediate the output of transistor 65 and the input of transmitter 41.

Considering now the operation of the FIG. 5 apparatus, the low level transducers 32*a* . . . 32*j* and their associated switching circuits operate in the same manner as for the transducers and switching circuits of FIG. 1. More particularly, the inverted gating signals $\overline{A_1} \ldots \overline{A_j}$ supplied to the switching circuit means for the low level transducers 32*a* . . . 32*j* of FIG. 5 serve to connect each of the transducers 32*a* . . . 32*j* one at a time in sequence to the first input terminal of the differential amplifier 56. The composite low level signal appearing at this first input terminal of differential amplifier 56 is represented by waveform 6A of FIG. 6. It is noted that during gating intervals $A_{j+1}$ through $A_n$, which are the gating intervals for the high level transducers and the sync signal generator, that this composite low level signal of waveform 6A remains constant at a voltage value determined by the source voltage +V connected to the far end of resistor 38.

During the midinterval intervals when exciting sinusoids are being applied to the transducers, the switch circuit 58 is nonconductive and the differential amplifier 56 tends to amplify the composite low level signal in a normal manner. During the idle intervals when no exciting sinusoids are being supplied to the transducers, the inverted timing signal (waveform 6F) appearing at the output of inverter circuit 46 serves to render the switch circuit 58 conductive. This provides a low impedance connection between the output of voltage comparator 57 and condenser 59. A feedback circuit is thus formed between the output and the second input terminal of the differential amplifier 56. The resulting feedback loop is a negative or degenerative type of feedback loop and operates to adjust the output voltage of amplifier 56 until it becomes equal to the reference voltage $V_r$ supplied to the voltage comparator 57. For the sake of an example, it is assumed that the reference voltage $V_r$ is equal to a value of zero volts or, in other words, that this input terminal of the voltage comparator 57 is grounded. In this case, the feedback loop will operate to keep the output of amplifier 56 at a zero potential level during the conductive intervals of switch circuit 58.

The purpose of condenser 59 in the feedback loop is to supply an input voltage for the second input terminal of amplifier 56 which is equal to the D.C. pedestal component being supplied at that moment to the first input terminal of amplifier 56. The value of the voltage drop across condenser 59 is automatically adjusted by the action of the feedback loop to accomplish this purpose. In other words, when the switch circuit 58 is conductive, the condenser 59 is rapidly charged by any error signal appearing at the output of voltage comparator 57 until the voltage drop across condenser 59 is equal or very nearly equal to the voltage level supplied to the first input terminal of the amplifier 56. When this occurs, the voltage level at the output of amplifier 56 is at the desired reference value of, in this case, zero volts. When the switch circuit 58 is non-conductive, then the high input impedance of the second input terminal of amplifier 56 enables the condenser 59 to hold its charge. This charge or voltage drop across condenser 59 then serves to balance out the pedestal component supplied to the first input terminal of amplifier 56 during the following gating interval. The variations in the voltage drop across condenser 59 are represented by waveform 6B of FIG. 6. Unfortunately, the bypassing action of condenser 59 for higher frequency components prevents any appreciable feedback of the switching transients of the composite low level signal to the second input terminal of the amplifier 56. Consequently, these switching transients are not very appreciably attenuated by the degenerative action of the feedback loop. Consequently, the feedback action provides substantial compensation only for the lower frequency or longer persisting pedestal components.

The composite low level signal appearing at the output of amplifier 56 is combined with the signals from the high level transducers 52 and 53 and the sync signal generator 73 by means of the individual diode switching circuits making up the switching circuit means 60. In particular, whenever any of the gating signals $A_1$–$A_j$ supplied to the OR circuit 64 is at a high level, which is the case during the occurrence of gating intervals $A_1$–$A_j$, the output of OR circuit 64 is at a high positive level. This disables the control diode 63. This enables the composite low level signal at the output of amplifier 56 to pass by way of resistor 61 and coupling diode 62 to the input of the emitter-follower transistor 65. During other than these low level gating intervals $A_1$–$A_j$, the output of OR circuit 64 will be at a low level of, for example, zero volts. This renders the diode 63 conductive and effectively short circuits the output side of resistor 61 to ground. This prevents any of the composite low level signal from reaching the emitter-follower transistor 65.

The remaining diode switching circuits operate in a similar manner. Thus, the switching circuit for the high level transducer 52 is controlled by the $A_{j+1}$ gating signal so that the control diode 69 is blocked during this gating interval. Consequently, the output signal from transducer 52 is transmitted by way of resistor 67 and coupling diode 68 to the input of emitter-follower transistor 65. During other than this $A_{j+1}$ gating interval, the control diode 69 is conductive and prevents any of the signal from transducer 52 from reaching emitter-follower transistor 65. During the $A_{n-1}$ gating interval, the control diode 72 is blocked to enable the passage of signals from transducer 53 to the transistor 65. Similarly, during the last or $A_n$ gating interval, the blocking of diode 76 enables the signal from sync signal generator 73 to be supplied to the transistor 65.

Figure 6:
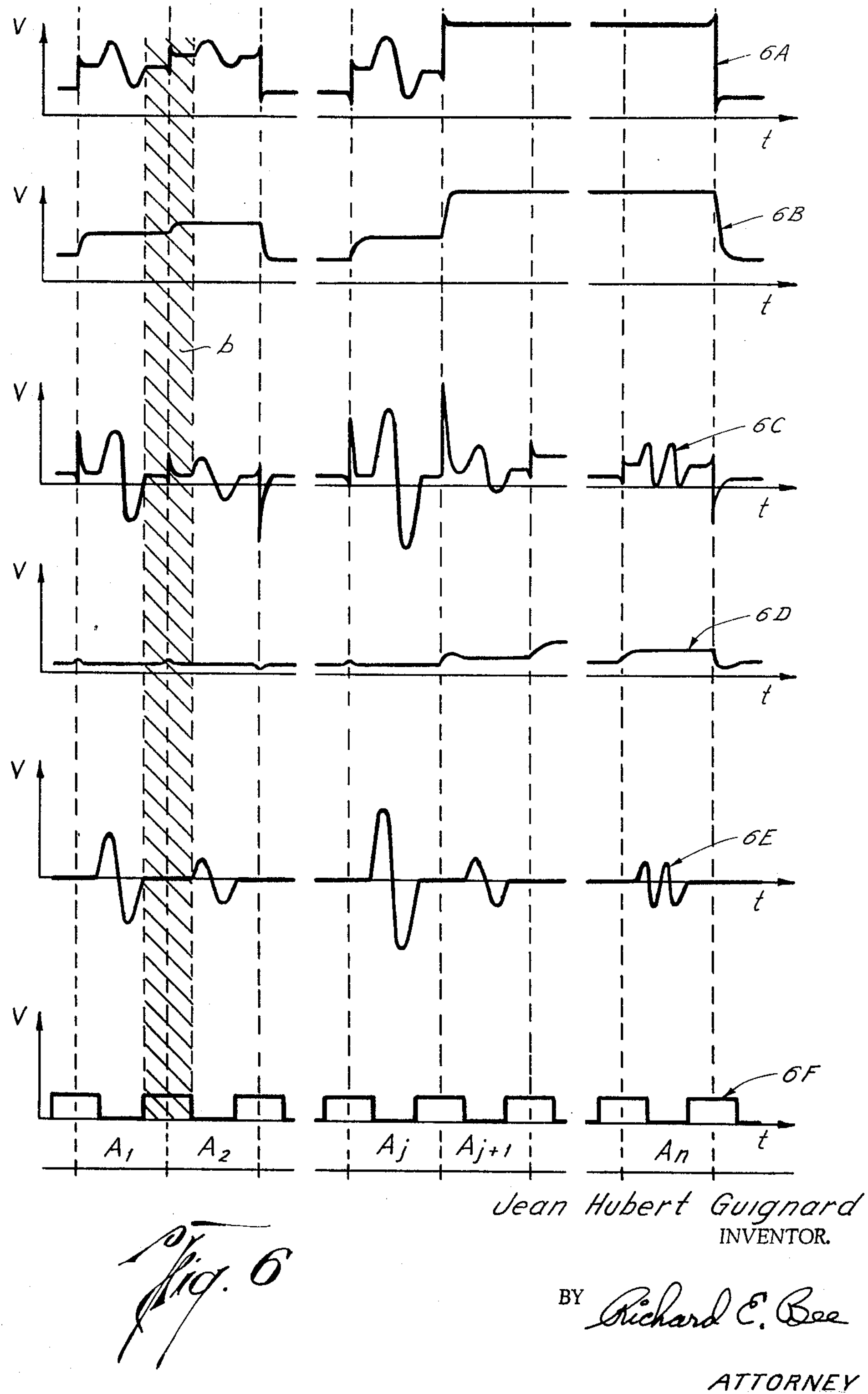
FIG. 6 is a timing diagram used in explaining the operation of the FIG. 5 embodiment.

The resulting composite signal at the input electrode (base electrode) of transistor 65 is represented by waveform 6C of FIG. 6. It is noted that the diode switching circuits 60 have introduced pedestal components into the composite signal. The pedestal components for the low level transducers (gating intervals $A_1$–$A_j$) are of equal value since these signals are supplied by way of the same diode switching circuit, namely, the circuit formed by elements 61, 62 and 63.

The composite signal at the input electrode of transistor 65 is reproduced across the emitter resistor 66. The pedestal components and switching transients in this signal are now removed by the clamping circuit means 42. This clamping circuit means 42 operates in the same manner as for the case of FIG. 1, the switch circuit 44 being conductive during the idle intervals intermediate the occurrence of the sinusoidal data signals. The resulting voltage drops across condenser 43 are represented by waveform 6D of FIG. 6. The signal supplied to the input of transmitter 41 is represented by waveform 6E. It is seen from waveform 6E that no pedestal components or switching transients are supplied to the transmitter 41. Only the desired sinusoidal data signal components are supplied to such transmitter 41 and, hence, to the remote receiving station.

The use of the differential amplifier 56 and associated feedback circuit as described in the FIG. 5 embodiment enables relatively weak transducer signals to be amplified by larger amounts without causing saturation of the amplifier 56 due to the presence of pedestal components of the same order of magnitude as the transducer signals themselves. This is because such pedestal components are effectively cancelled at the input of the amplifier and are not amplified thereby. This differential amplifier with feedback technique may be used in the FIG. 1 embodiment where operating conditions make it desirable, the differential amplifier and associated feedback circuits (elements 56–59) replacing the amplifier 40 of FIG. 1.

While there have been described what are at present considered to be preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. A telemetering encoder system comprising: a plurality of transducer means; a common output signal channel; diode switching circuit means including coupling diodes for individually coupling the different transducer means to the common output signal channel and circuit means for activating the coupling diodes one at a time in sequence; and clamping circuit means coupled to the common output signal channel for periodically clamping the signal level in the output channel at a predetermined constant value.

2. A telemetering encoder system comprising: a source of exciting signals; a plurality of transducer means; circuit means for supplying the exciting signals to each of the transducer means; a common output signal channel; switching circuit means for coupling the transducer means to the common output signal channel one at a time in sequence; and circuit means coupled to the common output signal channel for periodically causing the signal level in the output channel to assume a predetermined value.

3. A telemetering encoder system comprising: a plurality of transducer means for developing signals representative of physical quantities being measured; a common output signal channel; diode switching circuit means including coupling diodes for individually coupling the different transducer means to the common output signal channel and circuit means for activating the coupling diodes one at a time in sequence, such coupling diodes tending to add pedestal components to the transducer signals; and circuit means coupled to the common output signal channel for balancing out any pedestal components and passing only the transducer signals proper.

4. A telemetering encoder system comprising: a plurality of transducer means; circuit means for periodically supplying an exciting signal to each of the transducer means; a common output signal channel; switching circuit means for coupling the transducer means to the common output signal channel one at a time in sequence; and circuit means coupled to the common output signal channel and operative intermediate the occurrence of the exciting signals for causing the signal level in the output channel to assume a predetermined value during such operative intervals.

5. A telemetering encoder system comprising: a plurality of transducer means; circuit means for periodically supplying a pulse of sinusoidal exciting energy to each of the transducer means with no exciting energy being supplied intermediate these pulses; a common output signal channel; switching circuit means for coupling the transducer means to the common output signal channel one at a time in sequence; and circuit means coupled to the common output signal channel and operative intermediate the occurrence of the pulses of exciting energy for causing the signal level in the output channel to assume a predetermined value during such operative intervals.

6. A telemetering encoder system comprising: a plurality of transducer means; circuit means for periodically supplying a sinusoidal exciting signal to each of the transducer means; a common output signal channel; diode switching circuit means including coupling diodes for individually coupling the different transducer means to the common output signal channel and circuit means for activating the coupling diodes one at a time in sequence, such coupling diodes tending to add pedestal components to the transducer signals; and circuit means coupled to the common output signal channel for balancing out any pedestal components and passing only the sinusoidal transducer signals proper, this circuit means being operative intermediate the occurrence of the exciting signals for automatically adjusting itself to the pedestal component existing during the following exciting signal interval.

7. A telemetering encoder system comprising: a plurality of transducer means; circuit means for periodically supplying an exciting signal to each of the transducer means; a common output signal channel; switching circuit means for coupling the transducer means to the common output signal channel one at a time in sequence; and clamping circuit means coupled to the common output signal channel and operative intermediate the occurrence of the exciting signals for clamping the signal level in the output channel at a predetermined constant value during such operative intervals.

8. A telemetering encoder system comprising: a plurality of transducer means; circuit means for periodically supply an exciting signal to each of the transducer means; a common output signal channel; switching circuit means for coupling the transducer means to the common output signal channel one at a time in sequence, the switching between successive transducer means occurring intermediate the occurrence of successive exciting signals; and circuit means coupled to the common output signal channel and operative intermediate the occurrence of the exciting signals for causing the signal level in the output channel to assume a predetermined value during such operative intervals.

9. A telemetering encoder system comprising: a plurality of transducer means; a signal amplifier; circuit means for periodically supplying an exciting signal to each of the transducer means; switching circuit means for coupling the transducer means to the input of the signal amplifier one at a time in sequence; and circuit means coupled to the output of the signal amplifier and operative intermediate the occurrence of the exciting signals for causing the amplifier output signal level to assume a predetermined value during such operative intervals.

10. A telemetering encoder system comprising: a plurality of transducer means; a signal amplifier; diode switching circuit means including coupling diodes for individually coupling the different transducer means to the input of the signal amplifier and circuit means for activating the coupling diodes one at a time in sequence; and clamping circuit means coupled to the output of the signal amplifier and operative during the switching transitions in the switching circuit means for clamping the amplifier output at a predetermined signal level.

11. A telemetering encoder system comprising: a plurality of transducer means; a signal amplifier; switching circuit means for coupling the transducer means to the input of the signal amplifier one at a time in sequence; and feedback circuit means coupled between the output and the input of the signal amplifier for periodically causing the signal level at the amplifier output to assume a predetermined value.

12. A telemetering encoder system comprising: a plurality of transducer means; a differential signal amplifier having a pair of input terminals and a common output terminal; switching circuit means for coupling the transducer means to one of the amplifier input terminals one at a time in sequence; a signal storage means coupled to the other amplifier input terminals; and circuit means coupled to the amplifier output terminal for periodically supplying to the storage means a signal which will, at that moment, cause the signal at the amplifier output terminal to assume a predetermined reference value.

13. A telemetering encoder system comprising: a plurality of transducer means; a signal amplifier; diode switching circuit means including coupling diodes for individually coupling the different transducer means to the input of the signal amplifier and circuit means for activating the coupling diodes one at a time in sequence; transmitting means coupled to the output of the signal amplifier for transmitting the composite signal appearing thereat to another location; a condenser connected in series in the signal path intermediate the signal amplifier and the transmitting means; means providing a fixed reference potential; and switching means connected to the condenser on the side closer to the transmitting means and operative during the switching transitions in the diode switching circuit means for connecting this point along the signal path to the fixed reference potential means.

14. A telemetering encoder system comprising: a plurality of transducer means; circuit means for periodically supplying an exciting signal to each of the transducer means; a signal amplifier; switching circuit means for coupling the transducer means to the input of the signal amplifier one at a time in sequence, the switching between successive transducer means occurring intermediate the occurrence of successive exciting signals; transmitting means coupled to the output of the signal amplifier for transmitting the composite signal appearing thereat to another location; a condenser connected in series in the signal path intermediate the signal amplifier and the transmitting means; means providing a fixed reference potential; and switching means connected to the condenser on the side closer to the transmitting means and operative intermediate the occurrence of the exciting signals for connecting this point along the signal path to the fixed reference potential means.

15. A telemetering encoder system comprising: a plurality of transducer means; a common signal transmission path; diode switching circuit means including coupling diodes for individually coupling the different transducer means to the common signal path and circuit means for activating the coupling diodes one at a time in sequence; a condenser connected in series in the common signal path; means providing a fixed reference potential; and switching means connected to the side of the condenser electrically remote from the switching circuit means and operative during the switching transitions in the diode switching circuit means for connecting this point along the signal path to the fixed reference potential means.

References Cited by the Examiner

UNITED STATES PATENTS

| | | | |
|---|---|---|---|
| 2,468,703 | 4/1949 | Hammel | 340—206 |
| 2,689,950 | 9/1954 | Bayliss | 340—183 |
| 2,833,862 | 5/1958 | Tolson | 340—183 |
| 2,852,763 | 9/1958 | Westcott | 340—183 |
| 2,929,054 | 3/1960 | Golden | 340—183 |
| 2,937,369 | 5/1960 | Newbold | 340—183 |
| 3,059,228 | 10/1962 | Beck | 340—179 |
| 3,070,778 | 12/1962 | Werme | 340—183 |
| 3,135,832 | 6/1964 | Feingold | 340—183 |
| 3,153,761 | 10/1964 | Jankowitz | 340—182 |

NEIL C. READ, *Primary Examiner.*

THOMAS B. HABECKER, *Examiner.*